(12) United States Patent
Banta et al.

(10) Patent No.: US 8,368,340 B2
(45) Date of Patent: Feb. 5, 2013

(54) METHODS, SYSTEMS, AND DEVICES FOR A MOTOR CONTROL SYSTEM

(75) Inventors: Kevin D. Banta, Cedar Hills, UT (US); D. George Field, Pleasant Grove, UT (US); E. Carl Goodman, Bountiful, UT (US); Duane O. Hall, Sandy, UT (US)

(73) Assignee: Won-Door Corporation, Salt Lake City, UT (US)

( * ) Notice: Subject to any disclaimer, the term of this patent is extended or adjusted under 35 U.S.C. 154(b) by 0 days.

(21) Appl. No.: 13/365,855

(22) Filed: Feb. 3, 2012

(65) Prior Publication Data

US 2012/0133319 A1 May 31, 2012

Related U.S. Application Data

(63) Continuation of application No. 12/256,687, filed on Oct. 23, 2008, now Pat. No. 8,115,427.

(51) Int. Cl.
*G05B 19/25* (2006.01)

(52) U.S. Cl. ............... 318/571; 318/603; 318/561

(58) Field of Classification Search .................. 318/603, 318/561, 571, 605, 685
See application file for complete search history.

(56) References Cited

U.S. PATENT DOCUMENTS

| | | | |
|---|---|---|---|
| 4,832,158 A | 5/1989 | Farrar et al. | |
| 5,701,063 A | 12/1997 | Cook et al. | |
| 5,726,373 A | 3/1998 | Choi et al. | |
| 5,838,127 A | 11/1998 | Young et al. | |
| 5,990,640 A | 11/1999 | Dwyer et al. | |
| 6,153,990 A | 11/2000 | Feil et al. | |
| 6,292,215 B1 | 9/2001 | Vincent | |
| 6,487,062 B1 | 11/2002 | Kristiansen | |
| 6,535,811 B1 * | 3/2003 | Rowland et al. | ............... 701/115 |
| 6,662,848 B2 | 12/2003 | Goodman et al. | |
| 7,050,102 B1 | 5/2006 | Vincent | |
| 7,081,726 B2 | 7/2006 | Abe et al. | |
| 7,106,015 B2 | 9/2006 | Muroi | |
| 7,215,093 B2 | 5/2007 | Usui et al. | |
| 7,239,099 B2 | 7/2007 | Weinmann | |
| 2006/0087939 A1 | 4/2006 | Kuwayama | |
| 2007/0074089 A1 | 3/2007 | Matsumoto | |
| 2007/0124014 A1 | 5/2007 | Kim | |

* cited by examiner

*Primary Examiner* — Karen Masih
(74) *Attorney, Agent, or Firm* — TraskBritt

(57) ABSTRACT

Systems, devices, and methods for controlling a motor are disclosed. A method may include determining a rotational direction of a motor from a pair of quadrature signals sent to a microprocessor. The method further includes adjusting an internal count stored in the microprocessor at each edge of each of the pair of quadrature signals. The method further includes adjusting an external count stored in the microprocessor and transmitting an interrupt to a main controller after the first phase signal and the second phase signal have transitioned through each combinational logic state in one of a forward rotational direction and a reverse rotational direction. The method further includes transmitting a signal comprising the rotational direction of the motor and the external count from the microprocessor to a main controller.

25 Claims, 5 Drawing Sheets

METHODS, SYSTEMS, AND DEVICES FOR A MOTOR CONTROL SYSTEM

CROSS-REFERENCE TO RELATED APPLICATION

This application is a continuation of application Ser. No. 12/256,687, filed Oct. 23, 2008, now U.S. Pat. No. 8,115,427 issued Feb. 14, 2010, the disclosure of which is hereby incorporated herein by this reference in its entirety.

TECHNICAL FIELD

Embodiments of the present invention relate generally to motor control systems, devices, and methods and more specifically to motor control systems, devices, and methods for controlling rotational direction of a motor, dynamic braking of the motor, and providing accurate position and control of a movable partition or door driven by the motor.

BACKGROUND

Motor relay arrangements in an H-bridge configuration are conventionally used to control Direct Current (DC) motor direction. In its basic form, an H-bridge circuit typically includes four relays. On one side of the motor, a first relay connects a first motor terminal to a power source or an open circuit and a second relay connects the first motor terminal to ground or an open circuit. On the other side of the motor, a third relay connects a second motor terminal to a power source or an open circuit and a fourth relay connects the second motor terminal to ground or an open circuit. The H-bridge operates to cause current to flow through the motor, and cause forward rotation by energizing the first relay and the fourth relay, which causes current to flow through the first relay, through the motor from the first motor terminal to the second motor terminal, then to ground through the fourth relay. Similarly, to cause a backward rotation, the second relay and the third relay are energized, causing current to flow through the third relay, through the motor from the second motor terminal to the first motor terminal, then to ground through the second relay. Unfortunately, if the wrong combination of relays is energized, too much current may flow through the relays resulting in various problems including, for example, damage to the circuit, the motor, or both.

In addition, conventional motor control systems may exhibit deficiencies related to positional accuracy and control of a motor. FIG. 1 illustrates a timing diagram having quadrature signals (i.e., a first phase signal A and a second phase signal B) generated from an encoder within a motor control system. As known by one having ordinary skill in the art, if the first phase signal A leads the second phase signal B, then the direction of an associated motor is deemed to be positive or forward. Conversely, if the first phase signal A trails the second phase signal B, then the direction of the motor is deemed to be negative or reverse. As illustrated, during time period 270 (i.e., when signal B is trailing signal A), at each rising and falling edge of signal A and signal B, a count pulse 262 occurs and a position count value 264 is incremented. Similarly, during time period 280 (i.e., when signal A is trailing signal B), at each rising and falling edge of signal A and signal B, a count pulse 262 occurs and a position count value 264 is decremented. As such, signal A and signal B together may be indicative of a rotational direction of a motor and position count 264 may be indicative of a position of the motor.

Additionally, in conventional motor control systems, at each rising and falling edge of either signal A or signal B, an encoder may send interrupt and quadrature signals A and B to a controller. Upon receipt of quadrature signals A and B, the controller may determine a rotational direction of an associated motor. Additionally, the controller may determine a reference position of the motor by counting each rising and falling edge of signals A and B. With continued reference to FIG. 1, a time at which an interrupt is sent is depicted by interrupt events 260 (i.e., at the rising and falling edges of signal A). As shown in FIG. 2, during a first time period 470, signal B and signal A are both transitioning, signal B trails signal A and, therefore, an associated motor is moving in a forward or positive rotational direction. Conversely, during a second time period 480, neither signal A nor signal B are transitioning and, therefore, the associated motor is not in a rotational mode. Although the motor is not operating in a rotational mode during time period 480, the motor control system may experience vibrations which may cause false edges 266 in a signal (i.e., signal A). Accordingly, at each false edge 266, interrupt and quadrature signals with the false edge may be sent to the controller. As a result, a position count determined by the controller may be incorrect and the accuracy of the motor control system may be decreased.

Furthermore, as understood by one having ordinary skill in the art, sending an interrupt to a controller at each rising and falling edge of either signal A or signal B may be demanding on the controller. Moreover, in conventional motor control systems, an interrupt control configured to receive an interrupt may also be configured to receive communication signals. Therefore, when an interrupt control is busy handling a communication signal, attention to an interrupt signal may be delayed, resulting in inaccurate position counts and decreased accuracy of the motor control system.

A need exists to control a DC motor in both the forward rotational direction and the reverse rotational direction, and enable dynamic braking of the motor. Moreover, a need exists to improve the positional accuracy and control of a motor control system.

BRIEF SUMMARY OF THE INVENTION

The present invention provides a motor control circuit for controlling the rotational direction of a motor while enabling dynamic braking and providing additional improvements and advantages over the prior art.

In one embodiment of the present invention, a method of controlling a motor is provided. The method includes determining a rotational direction of a motor from a pair of quadrature signals sent to a microprocessor. The method further includes adjusting an internal count stored in the microprocessor at each edge of each of the pair of quadrature signals. The method also includes adjusting an external count stored in the microprocessor and transmitting an interrupt and a signal indicating the rotational direction of the motor and the external count from the microprocessor to a main controller. Adjusting the external count and transmitting the interrupt occurs after the first phase signal and the second phase signal have transitioned through each combinational logic state in one of a forward rotational direction and a reverse rotational direction.

In another embodiment of the present invention, a motor control device is provided. The device includes a microprocessor configured to receive a pair of quadrature signals from an encoder operably coupled to a motor. The microprocessor is further configured to output a signal indicative of a direction of the motor and a position of the motor to a main controller operably coupled thereto in response to an interrupt event. The microprocessor is also configured to output a plurality of control signals. The device further includes a motor control circuit operably coupled to the microprocessor and comprising a plurality of field effect transistors. The motor control circuit is configured to control an operation of the motor in response to receiving the plurality of control signals from the microprocessor.

Another embodiment of the present invention may include a motor control system including a motor and a motor control device such as the motor control device described above. In one embodiment, the motor may include a direct current (DC) motor rated at approximately 14 volts or higher. In another exemplary embodiment, the motor may include a DC motor rated at approximately 24 volts.

The system may include additional components depending, for example, on the intended application of the motor. For example, in one embodiment the motor may be operably coupled to a portion of a movable partition in order to deploy and retract or otherwise displace the partition. Such a partition may include, for example, a folding or accordion-style door having a plurality of hingedly coupled panels. The partition may be configured as a fire barrier in one particular example. Of course, the system may include other components and be configured for other applications as will be appreciated by those of ordinary skill in the art.

DETAILED DESCRIPTION OF THE INVENTION

In the following description, circuits may be shown in block diagram form in order not to obscure the present invention in unnecessary detail. Conversely, specific circuit implementations shown and described are examples only and should not be construed as the only way to implement the present invention unless specified otherwise herein. Additionally, block definitions and partitioning of logic between various blocks is exemplary of a specific implementation. It will be appreciated by those of ordinary skill in the art that the present invention may be practiced by numerous other partitioning solutions. For the most part, details concerning timing considerations and the like have been omitted inasmuch as such details are not necessary to obtain a complete understanding of the present invention and are within the ability of persons of ordinary skill in the relevant art.

The terms "assert" and "negate" are respectively used when referring to the rendering of a signal, status bit, or similar apparatus into its logically true or logically false state. If the logically true state is a logic level one, the logically false state will be a logic level zero. Conversely, if the logically true state is a logic level zero, the logically false state will be a logic level one.

The term "bus" is used to refer to a plurality of signals or conductors, which may be used to transfer one or more various types of information, such as data, addresses, control, or status. Additionally, a bus or a collection of signals may be referred to in the singular as a signal. Some drawings may illustrate signals as a single signal for clarity of presentation and description. It will be understood by a person of ordinary skill in the art that the signal may represent a bus of signals, wherein the bus may have a variety of bit widths and the present invention may be implemented on any number of data signals including a single data signal.

As used herein, the terms "rotating the motor," effecting, causing, or inducing "rotation" of the motor, or a "rotational mode" of the motor, refer to the relative rotational movement between the components of a motor such as a rotor and stator.

Additionally, as used herein, the term "each combinational logic state" refers to each binary combinational logic state of two transitioning signals. More specifically, "each combinational logic state" of two transitioning signals generated from a forward rotating motor would comprise "00," "10," "11," and "01." Similarly, "each combinational logic state" of two transitioning signals generated from a reverse rotating motor would comprise "00," "01," "11," and "10."

Figure 1:
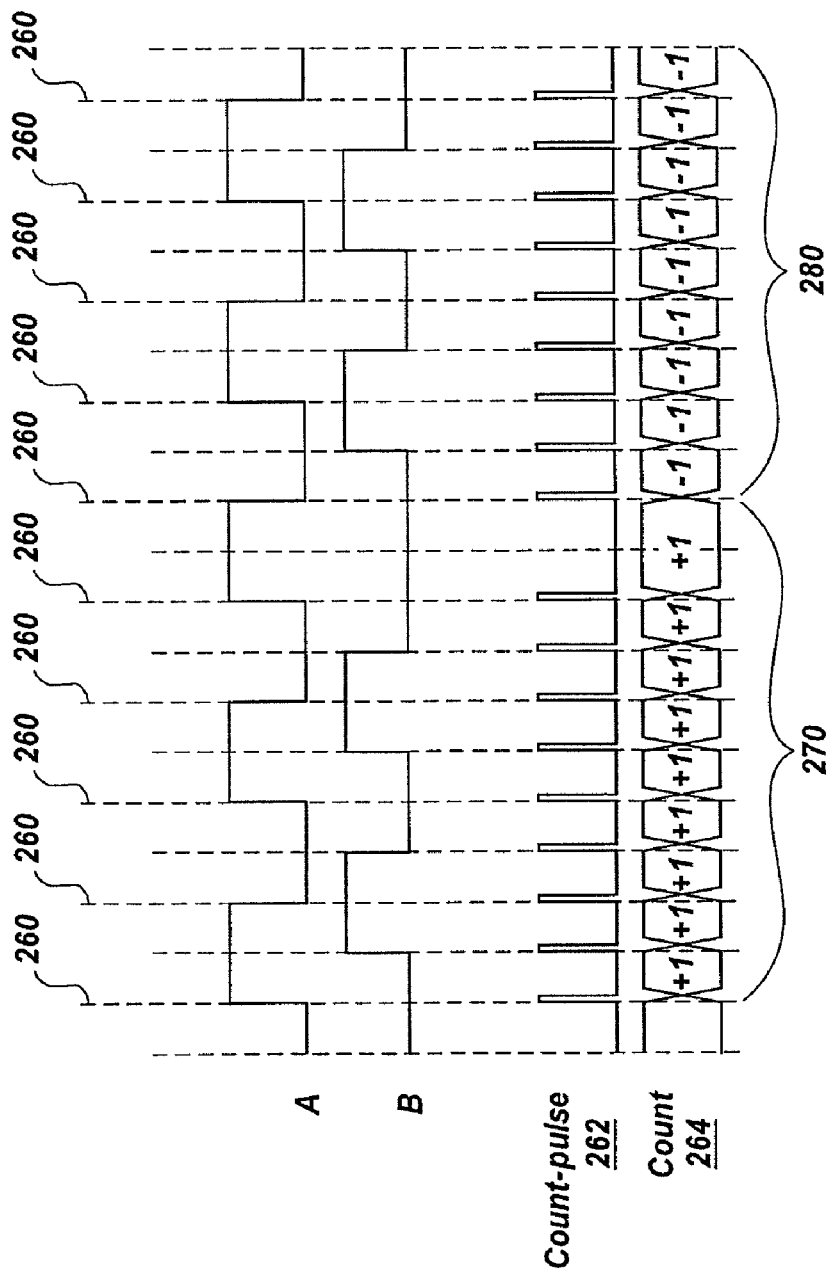
FIG. 1 is a timing diagram including quadrature signals indicative of a rotational direction of an associated motor and a count indicative of a position of the motor in a conventional motor control system.
Figure 2:
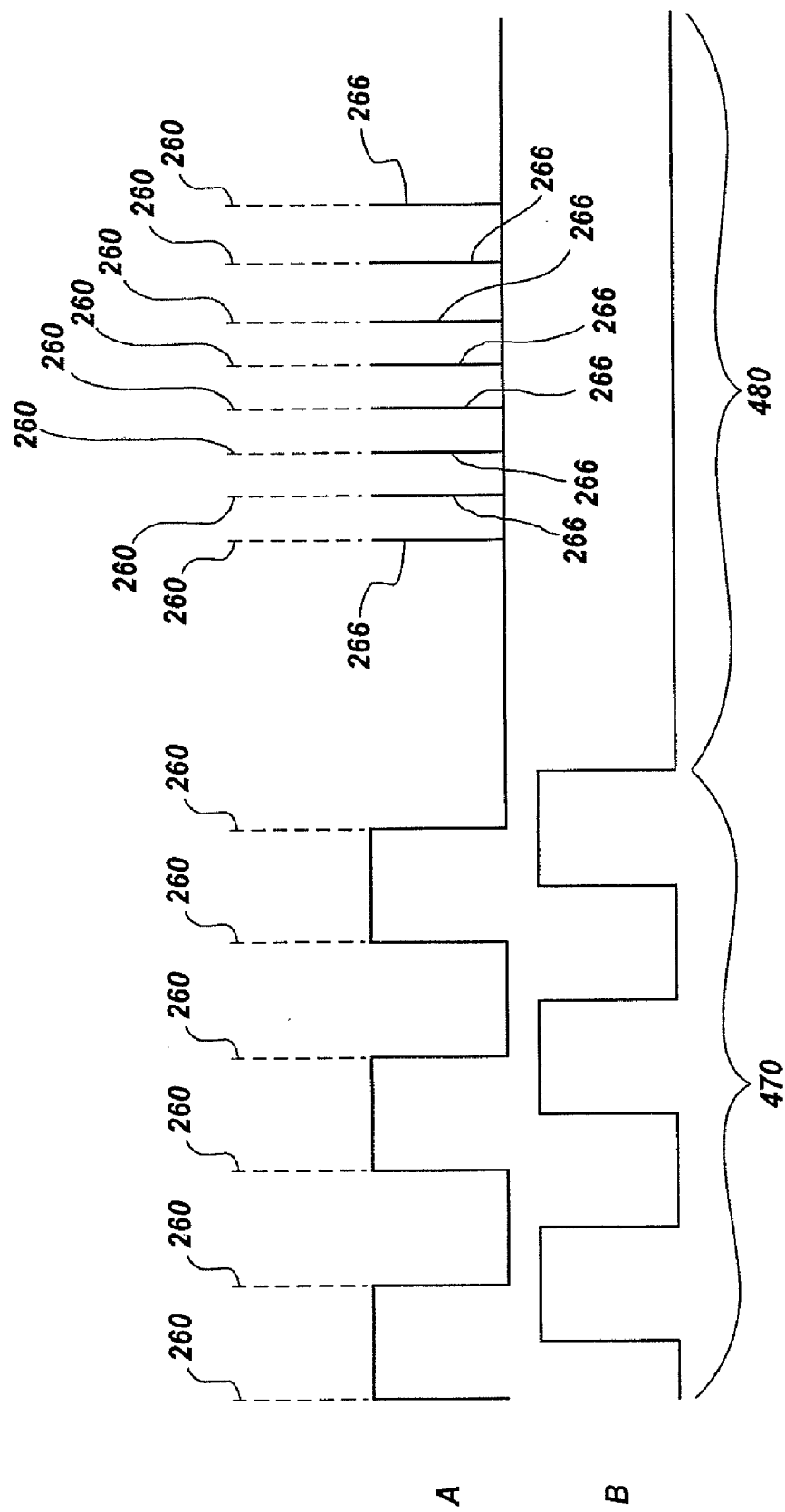
FIG. 2 is another timing diagram including quadrature signals of a conventional motor control system.
Figure 3:
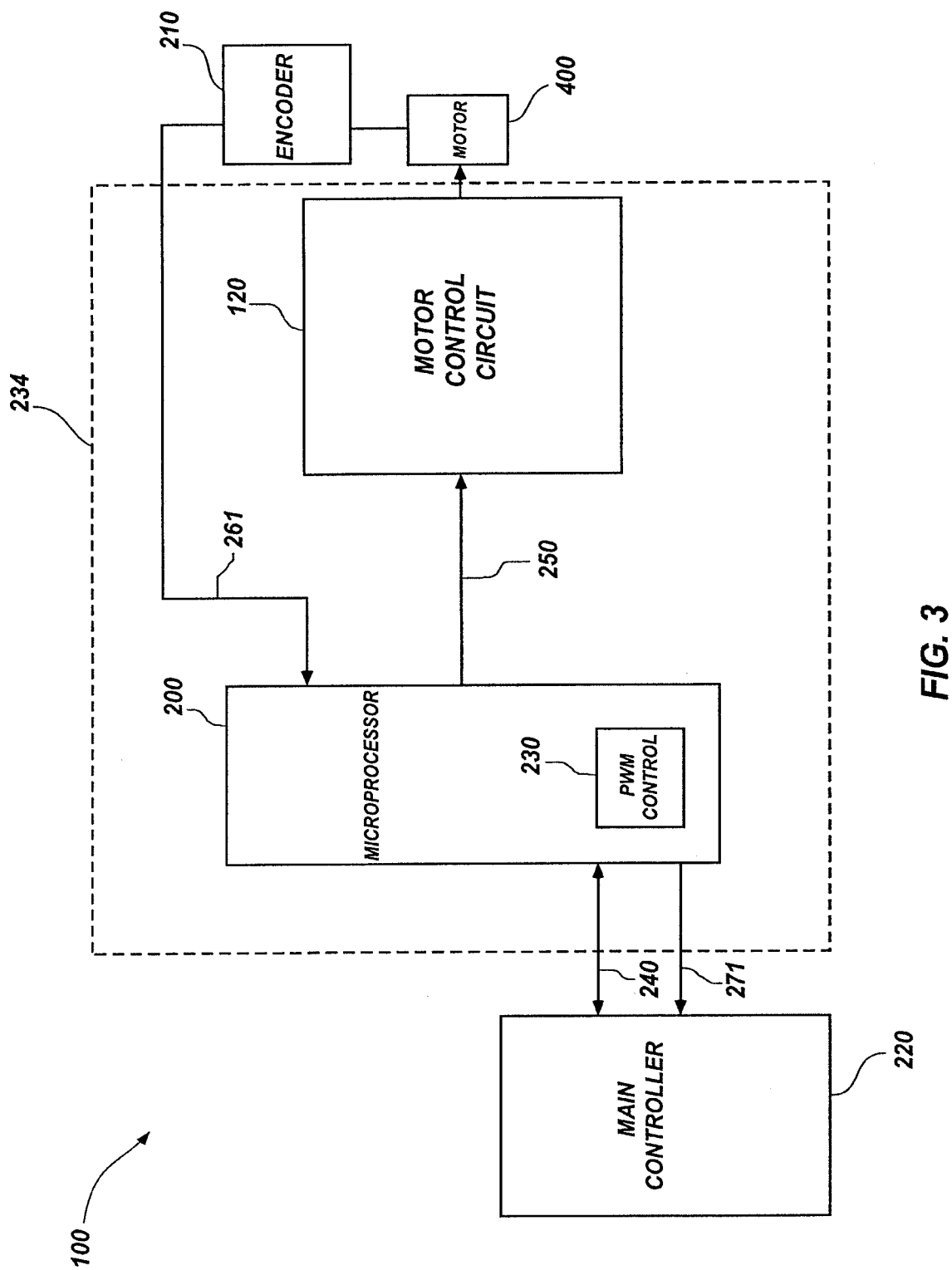
FIG. 3 is a block diagram of a motor control system having a motor control board including a processor and motor control circuit, in accordance with an embodiment of the present invention.

FIG. 3 illustrates a motor control system 100 including a microprocessor 200 and a motor control circuit 120 operably coupled to a motor 400. Microprocessor 200 may be any suitable microprocessor and may include pulse width modulation (PWM) control 230. Microprocessor 200 may be operably coupled to motor control circuit 120 via bus 250 and interrupt line 271. According to an embodiment of the present invention, microprocessor 200 may be a processor dedicated to motor control circuit 120. Therefore, in this embodiment, microprocessor 200 and motor control circuit 120 may be located together on a motor control device 234, such as a motor control board. Motor control system 100 may also include an encoder 210 including one or more sensors (not shown) and a main controller 220. Encoder 210 and main controller 220 may be operably coupled to microprocessor 200 via respective buses 261 and 240.

The motor control system 100 of the present invention may be used to control motor 400 in association with a variety of applications. As an example, in one embodiment, the motor control system 100 may be used to control a motor shaft of a movable door or a movable partition such as is described in U.S. Pat. No. 6,662,848 entitled AUTOMATIC DOOR AND METHOD OF OPERATING SAME. Of course, numerous other applications are contemplated as will be appreciated by those of ordinary skill in the art.

Main controller 220 may be any suitable controller and may be configured to monitor the state of a movable device (e.g., a movable door or a movable partition), monitor other aspects related to the control of the movable device, and thereby operate the movable device under a defined set of parameters or rules. Main controller 220 may be further configured to transmit one or more control signals via bus 240 to microprocessor 200 related to an operation of the movable device, such as, for example only, an "open" operation signal, a "close" operation signal, or a "brake" operation signal.

In response to receiving an "open" control signal from main controller 220, microprocessor 200 may be configured to transmit a plurality of control signals to motor control circuit 120 to cause the motor 400 to rotate in a first rotational direction. Similarly, in response to receiving a "close" control signal from main controller 220, microprocessor 200 may transmit a plurality of control signals to motor control circuit 120 to cause the motor 400 to rotate in a second rotational direction. Furthermore, in response to receiving a "brake" control signal from main controller 220, microprocessor 200 may be configured to transmit a plurality of control signals to motor control circuit 120 to cause rotation of the motor 400 to cease in either direction.

Figure 4:
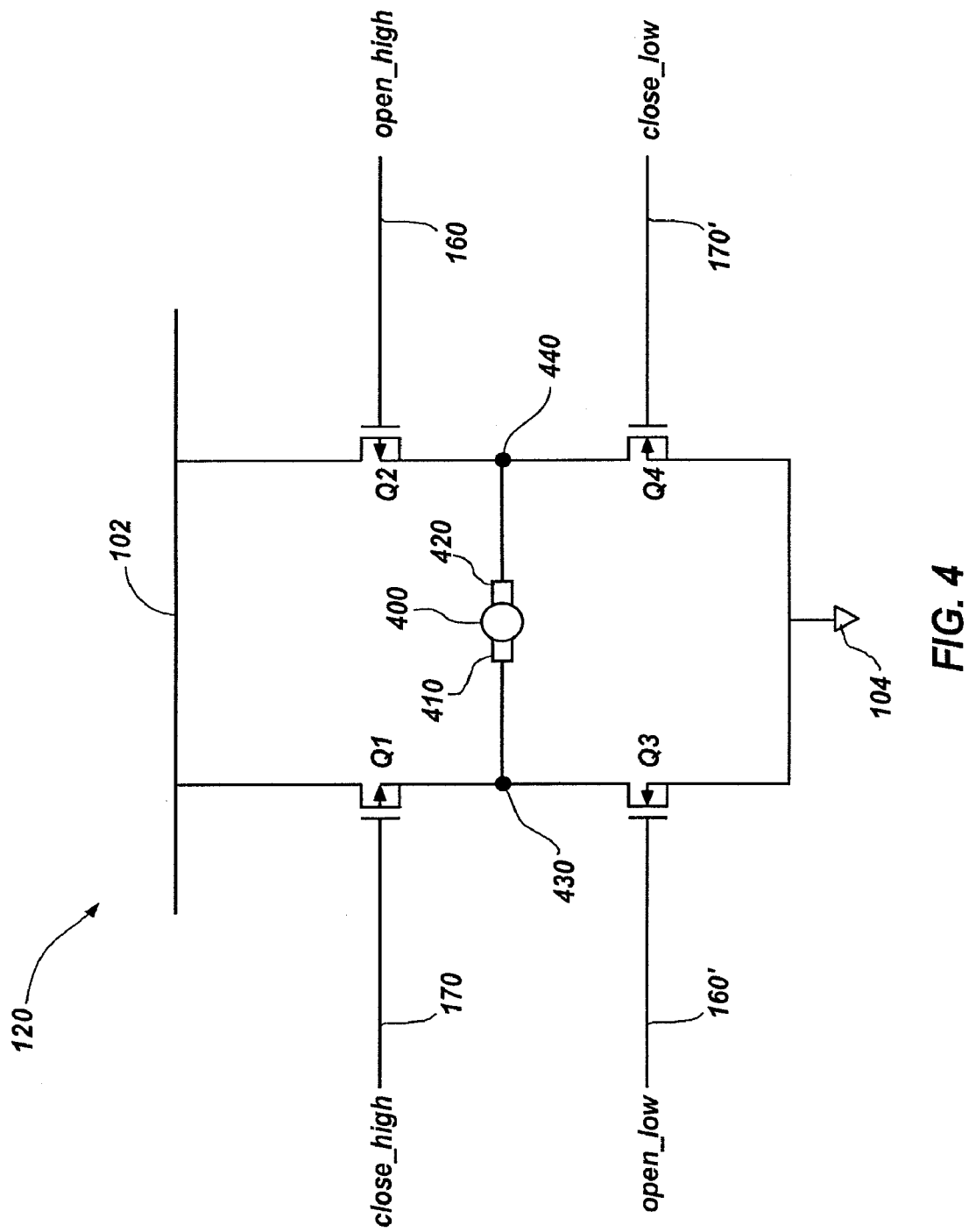
FIG. 4 is a circuit diagram of a motor and a motor control circuit, according to an embodiment of the present invention.

FIG. 4 depicts a circuit diagram of motor 400 and motor control circuit 120. Motor control circuit 120 includes a first switching device Q1, a second switching device Q2, a third switching device Q3, and a fourth switching device Q4. For example only, and not by way of limitation, first switching device Q1, second switching device Q2, third switching device Q3, and fourth switching device Q4 may each comprise field effect transistors (FETs). Additionally, for example only, first switching device Q1 and second switching device Q2 may comprise p-channel devices and third switching device Q3 and fourth switching device Q4 may comprise n-channel devices. As illustrated in FIG. 4, a drain of first switching device Q1 is operably coupled to a power source 102 and a gate of first switching device Q1 is operably coupled to a close_high signal 170. Power source 102 includes a voltage suitable for driving a DC motor rated at 12 volts DC or higher, such as a 24 volt DC motor. Moreover, a drain of second switching device Q2 is operably coupled to power source 102 and a gate of second switching device Q2 is operably coupled to an open_high signal 160. The sources of first switching device Q1 and second switching device Q2 are operably coupled to the drains of third switching device Q3 and fourth switching device Q4, respectively. The sources of third switching device Q3 and fourth switching device Q4 are each operably coupled to a ground voltage 104. Furthermore, a gate of third switching device Q3 is operably coupled to an open_low signal 160' and a gate of fourth switching device Q4 is operably coupled to a close_low signal 170'.

Motor 400 includes a first motor terminal 410 operably coupled to a first node 430 located between the source of first switching device Q1 and the drain of third switching device Q3. Motor 400 also includes a second motor terminal 420 operably coupled to a second node 440 located between the source of second switching device Q2 and the drain of fourth switching device Q4. Motor 400 may include a DC motor which, as will be appreciated by those of ordinary skill in the art, may include a stator-rotor combination or a commutator-armature combination configured to effect rotational motion of an output component such as a shaft. In one particular embodiment, the present invention may be practiced with a motor rated at 12 volts DC or higher, such as a 24 volt DC motor, although motors of other voltages may be utilized with the present invention.

In operation, motor control circuit 120 may be thought of as operating in a dynamic braking mode when open_high signal 160 and close_high signal 170 are each asserted and open_low signal 160' and close_low signal 170' are each negated. Motor control circuit 120 may also operate in a dynamic braking mode when open_high signal 160 and close_high signal 170 are each negated and open_low signal 160' and close_low signal 170' are each asserted. Furthermore, the motor control circuit 120 may be thought of as operating in a rotational mode when close_high signal 170 and close_low signal 170' are each asserted and open_high signal 160 and open_low signal 160' are each negated. Motor control circuit 120 may also operate in a rotational mode when open_high signal 160 and open_low signal 160' are each asserted and close_high signal 170 and close_low signal 170' are each negated.

In the rotational mode, the motor control circuit 120 may cause the motor 400 to rotate in a first rotation direction or in a second rotation direction, depending on the state of open_high signal 160, close_high signal 170, open_low signal 160', and close_low signal 170'. In the rotational mode, motor 400 is enabled to rotate because first motor terminal 410 is operably coupled to power source 102 and second motor terminal 420 is operably coupled to ground voltage 104, or vice versa. More specifically, motor 400 may rotate in the first rotation direction if open_high signal 160 and open_low signal 160' are each asserted and close_high signal 170 and close_low signal 170' are each negated. The first rotation direction is enabled because the asserted open_high signal 160 causes second switching device Q2 to conduct, and the asserted open_low signal 160' causes third switching device Q3 to conduct. Similarly, the negated close_high signal 170 and the negated close_low signal 170' prevent respective first and fourth switching devices Q1 and Q4 from conducting. As a result, the second motor terminal 420 connects to power source 102 and the first motor terminal 410 connects to ground 104, which may cause motor 400 to rotate in the first rotation direction.

On the other hand, the motor 400 may rotate in the second rotation direction if the open_high signal 160 and open_low signal 160' are each negated and the close_high signal 170 and close_low signal 170' are each asserted. The second rotation direction is enabled because the asserted close_high signal 170 causes first switching device Q1 to conduct, and the asserted close_low signal 170' causes fourth switching device Q4 to conduct. Similarly, the negated open_high signal 160 and negated open_low signal 160' prevent respective second and third switching devices Q2 and Q3 from conducting. As a result, the first motor terminal 410 connects to power source 102 and the second motor terminal 420 connects to ground voltage 104, which may cause motor 400 to rotate in the second rotation direction.

To operate in the dynamic braking mode, either open_high signal 160 and close_high signal 170 are each negated and open_low signal 160' and close_low signal 170' are each asserted, or open_high signal 160 and close_high signal 170 are each asserted and open_low signal 160' and close_low signal 170' are each negated. With open_high signal 160 and close_high signal 170 each negated and both open_low signal 160' and close_low signal 170' asserted, neither first switching device Q1 nor second switching devices Q2 is conducting, third switching device Q3 and fourth switching device Q4 are both conducting and, therefore, first motor terminal 410 and second motor terminal 420 are each connected to ground 104. On the other hand, with open_high signal 160 and close_high signal 170 both asserted and both open_low signal 160' and close_low signal 170' negated, neither third switching device Q3 nor fourth switching device Q4 are conducting, first switching device Q1 and second switching device Q2 are both conducting and, therefore, first motor terminal 410 and second motor terminal 420 are each connected to power source 102.

As will be appreciated by one having ordinary skill in the art, pulse width modulation control 230 (see FIG. 3) may be configured to generate the control signals sent from microprocessor 200 to motor control circuit 120 to allow for variable speed control of motor 400. For example, control of motor 400 implementing pulse width modulation may allow motor 400 to start and stop slowly and, therefore, reduce wear and tear on motor 400 and motor control system 100.

Figure 5A:
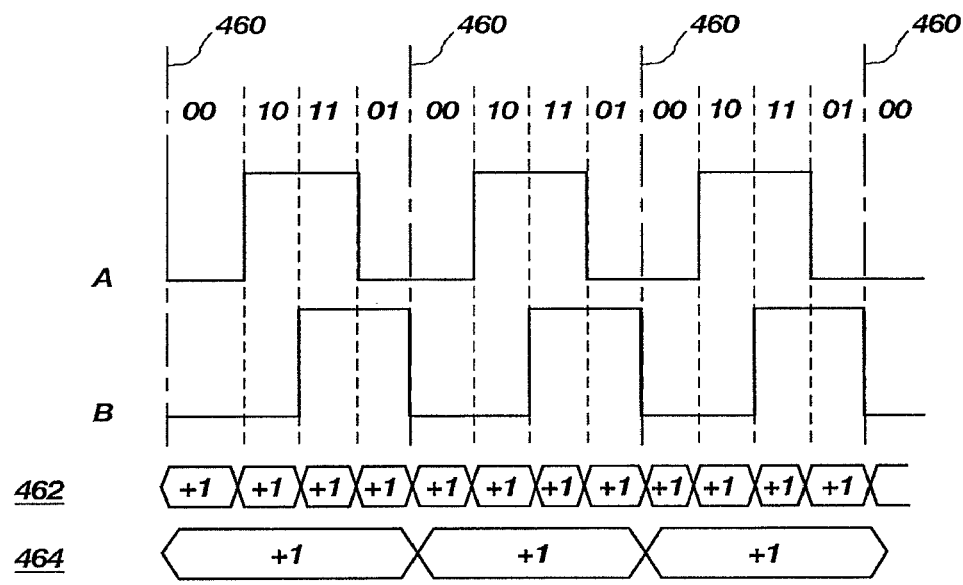
FIGS. 5A and 5B are timing diagrams including quadrature signals, internal counts, and external counts, according to an embodiment of the present invention.
Figure 5B:
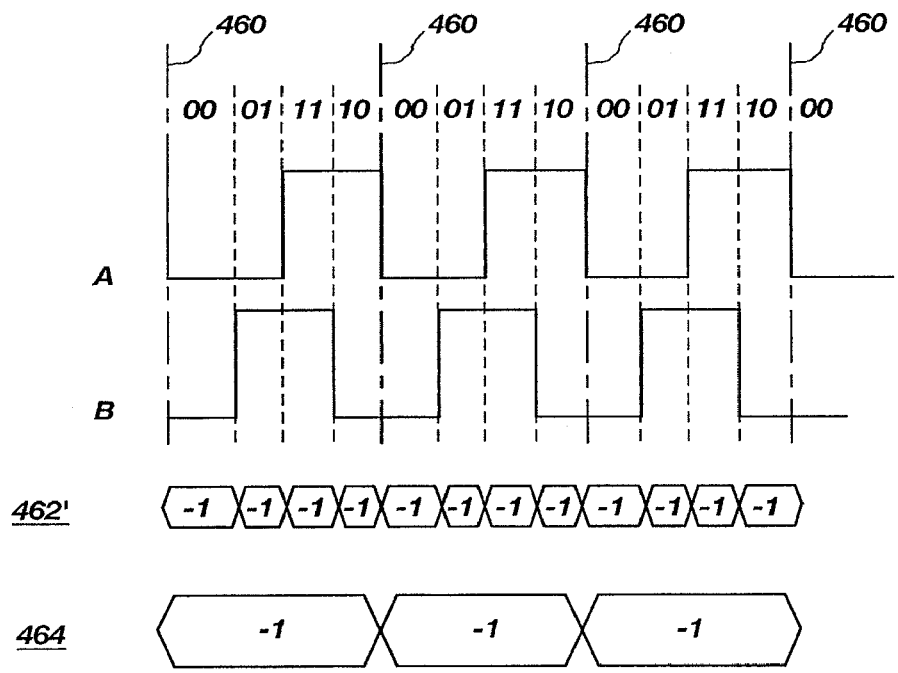

With reference to FIGS. 3, 5A, and 5B, encoder 210 may be coupled to motor 400 and may be configured to output quadrature signals (i.e., a first phase signal A and a second phase signal B) correlated to the relative position between the rotor and stator within motor 400. As described above, if the first phase signal A leads the second phase signal B, then the direction of an associated motor is deemed to be positive or forward. Conversely, if the first phase signal A trails the second phase signal B, then the direction of the motor is deemed to be negative or reverse. According to an embodiment of the present invention, upon receipt of quadrature signals A and B, microprocessor 200 may be configured to determine a rotational direction of the motor and track a position of the motor by either incrementing an internal increment count 462 at each combinational logic state (i.e., "00," "10," "11," and "01") in a forward rotational cycle, as shown in FIG. 5A or decrementing an internal decrement count 462' at each combinational logic state (i.e., "00," "01," "11," and "10") in a reverse rotational cycle, as shown in FIG. 5B.

Microprocessor 200 may also be configured to increment or decrement an external count 464 after completion of a complete cycle of first phase signal A and second phase signal B (i.e., after first phase signal A and second phase signal B have transitioned through each combinational logic state, "00," "10," "11," and "01" for a forward rotation or "00," "01," "11," and "10" for a reverse rotation). Additionally, according to an embodiment of the present invention, microprocessor 200 may be configured to output an interrupt and a signal indicating the rotational direction of the motor and external count 464 to main controller 220. In contrast to prior art motor control systems described above, microprocessor 200 may be configured to output the interrupt to main controller 220 after completion of a complete cycle of first phase signal A and second phase signal B (shown by interrupt events 460), (i.e., after first phase signal A and second phase signal B have transitioned through each combinational logic state, "00," "10," "11," and "01" for a forward rotation or "00," "01," "11," and "10" for a reverse rotation).

Stated another way, upon receipt of quadrature signals A and B from encoder 210, microprocessor 200 may determine a rotational direction of an associated motor and monitor a position of the motor by maintaining internal increment count 462 and internal decrement count 462'. Furthermore, microprocessor 200 may, upon a completed transition through each combinational logic state of signal A and signal B in one direction, increment or decrement external count 464 accordingly, and send an interrupt to main controller 220. Thereafter, a signal is sent to main controller 220 identifying the rotational direction of the motor and the external count 464, which is indicative of the position of the motor. Because external count 464 is not modified and an interrupt is not sent until after completion of each transitional state in a forward or reverse direction, main controller 220 will receive less interrupts and will handle less transitional states than a controller in prior art systems. Consequently, the processing load on main controller 220 may be reduced in comparison to prior art systems. Furthermore, by modifying external count 464 and sending an interrupt only after completion of each combinational logic state, any vibrations experienced by the motor control system which may cause false edges will not trigger undesired interrupt or undesired count increments or count decrements.

Although, in the embodiments described above, microprocessor 200 is configured to output the rotational direction of the motor and external count 464 to main controller 220 after completion of a complete cycle of first phase signal A and second phase signal B (shown by interrupt events 460), embodiments of the invention are not so limited. In another embodiment of the present invention, main controller 220 may be configured to send a signal to microprocessor 200 requesting a status of the rotational direction of motor 400 and/or the position of motor 400. Upon receipt of the signal, microprocessor 200 may transmit a signal indicating the rotational direction of the motor 400 and/or external count 464 to main controller 220.

While the present invention has been described herein with respect to certain preferred embodiments, those of ordinary skill in the art will recognize and appreciate that it is not so limited. Rather, many additions, deletions, and modifications to the preferred embodiments may be made without departing from the scope of the invention as hereinafter claimed. In addition, features from one embodiment may be combined with features of another embodiment while still being encompassed within the scope of the invention as contemplated by the inventors.

What is claimed is:

1. A motor system, comprising:
   a motor;
   a motor control circuit operably coupled with the motor; and
   a processor operably coupled with the motor control circuit, the processor comprising:
      at least one monitoring input for receiving a first signal indicating at least one of a rotational direction of a motor and a position of the motor; and
      at least one reporting output for transmitting a second signal indicating at least one of the rotational direction of the motor and the position of the motor, wherein the processor is configured to transmit the second signal to a main controller at a rate that is less frequent than a rate for adjustments of the first signal.

2. The motor system of claim 1, wherein the processor is configured to transmit the second signal to the main controller responsive to an interrupt event.

3. The motor system of claim 1, wherein the processor is configured to transmit the second signal at a conclusion of a predetermined cycle of the adjustments of the first signal.

4. The motor system of claim 1, wherein the predetermined cycle of the adjustments is determined by combination logic states of a pair of quadrature signals for the first signal.

5. The motor system of claim 1, wherein the processor further comprises:
   at least one command input for receiving at least one system command from the main controller; and
   at least one control output for transmitting at least one motor control signal to the motor control circuit responsive to the at least one system command.

6. The motor system of claim 5, wherein the at least one system command includes at least one of an "open" control signal, a "close" control signal, and a "brake" control signal for a movable partition driven by the motor.

7. The motor system of claim 5, wherein the at least one motor control signal comprises at least one pulse width modulation signal to adjust a rotational speed of the motor.

8. The motor system of claim 5, wherein the processor is further configured to temporarily operate the motor at a relatively slower rate before stopping the motor and upon startup of the motor relative to a steady state operation of the motor.

9. The motor system of claim 1, wherein the motor is operably coupled to the motor control circuit in an H-bridge configuration.

10. The motor system of claim 9, wherein the motor control circuit comprises transistors as switching elements of the H-bridge configuration.

11. The motor system of claim 1, wherein the motor is operably coupled with a movable partition and configured to drive the movable partition along a track of a movable partition system.

12. A method of controlling a motor, the method comprising:
   monitoring adjustments in a signal indicating at least one of a rotational direction and a position of a motor;
   reporting at least one of the rotational direction and the position of the motor to a main controller of a motor control system at a rate less frequent than a rate of the adjustments of the signal; and
   controlling movement of the motor with a plurality of motor control signals in response to control signals received from the main controller.

13. The method of claim 12, wherein controlling movement of the motor with the plurality of motor control signals comprises transmitting a plurality of pulse width modulation signals to a motor control circuit controlling the motor.

14. The method of claim 13, wherein transmitting the plurality of pulse width modulation signals to the motor control circuit comprises adjusting a rotational speed of the motor during a start up mode and a stop mode of the motor.

15. The method of claim 12, wherein controlling movement of the motor with the plurality of motor control signals comprises transmitting a plurality of switching signals to a plurality of switching elements coupled with the motor in an H-bridge configuration.

16. The method of claim 12, wherein reporting the rotational direction and the position of the motor to the main controller of a motor control system at a rate less frequent than a rate of the adjustments of the signal includes adjusting an internal count from the adjustments of the signal more frequently than an external count signal that is transmitted to the main controller.

17. The method of claim 16, wherein reporting the rotational direction and the position of the motor to the main controller of a motor control system at a rate less frequent than a rate of the adjustments of the signal includes transmitting the external count signal to the main controller after a complete rotational cycle is completed for the internal count.

18. The method of claim 12, wherein reporting the rotational direction and the position of the motor to the main controller of a motor control system at a rate less frequent than a rate of the adjustments of the signal includes transmitting an external count signal in response to the main controller requesting a status of the motor from a processor.

19. A method of installing a motor control device, the method comprising:
   positioning a motor, a motor control circuit, and a main controller to interface with a processor;
   operably coupling a control output of the processor to the motor control circuit, the control output configured to transmit at least one motor control signal to the motor control circuit;
   configuring a monitoring input of the processor to receive a first signal indicating at least one of a rotational direction of a motor and a position of the motor;
   operably coupling a reporting output of the processor to the main controller; and
   configuring the processor to transmit a second signal through the reporting output to the main controller at a rate less frequent than a rate of adjustments of the first signal, the second signal indicating at least one of the rotational direction of the motor and the position of the motor.

20. The method of claim 19, wherein operably coupling the control output of the processor to the motor control circuit comprises coupling the processor to the motor control circuit in a configuration that enables the at least one motor control signal to drive the motor at a reduced rotational speed of the motor during at least one of a startup of the motor and a period of time before stopping the motor.

21. The method of claim 19, further comprising operably coupling a portion of a movable partition to the motor to enable the motor to displace the movable partition.

22. The method of claim 19, wherein configuring the monitoring input to receive the first signal comprises configuring the monitoring input to receive a pair of quadrature signals from an encoder operably coupled to the motor.

23. The method of claim 19, wherein configuring the processor to transmit a second signal to the main controller at a rate less frequent than a rate of adjustments of the first signal comprises configuring the processor to transmit the second signal responsive to completion of a combinational logic cycle of the pair of quadrature signals.

24. The method of claim 19, wherein configuring the processor to transmit a second signal to the main controller at a rate less frequent than a rate of adjustments of the first signal comprises configuring the processor to transmit the second signal responsive to receiving a status request signal from the main controller.

25. The method of claim 19, wherein configuring the processor to transmit a second signal to the main controller at a rate less frequent than a rate of adjustments of the first signal comprises configuring the processor to transmit the second signal responsive to an internal count of the processor reaching a predetermined status.

* * * * *